June 29, 1926.

R. B. BUCHANAN 1,590,280

CHUCK

Filed Oct. 15, 1924

Inventor
Robert Burnett Buchanan
by Fetherstonhaugh & Co
attys

Patented June 29, 1926.

1,590,280

UNITED STATES PATENT OFFICE.

ROBERT BURNETT BUCHANAN, OF HAMILTON, ONTARIO, CANADA.

CHUCK.

Application filed October 15, 1924. Serial No. 743,808.

My invention relates to improvements in chucks with more particular reference to chucks intended for carrying an axial pull load such as pulling or lifting chucks, as distinguished from chucks intended for transmitting a torsional load, and the object of the invention is to provide a chuck of this type having a self gripping feature whereby the chuck will automatically grip work to be handled, by the simple operation of pushing the work into the chuck jaws or pushing the chuck onto the work without necessitating the performance of any adjustments or tightening operations whatever, and in which the operation of releasing the work from the chuck is extremely simple and convenient; a further object is to provide such a chuck in which the work is firmly held against axial pull and in which the grip of the chuck upon the work becomes tighter as the axial pull increases; a further object is to provide such a chuck which will be of simple and inexpensive construction.

Other objects will appear in the course of the following specification.

My invention consists in the construction and arrangements of parts, all as hereinafter more particularly described and illustrated in the accompanying drawings in which:—

In the drawings, like characters of reference indicate corresponding parts in the different views.

Figure 5:
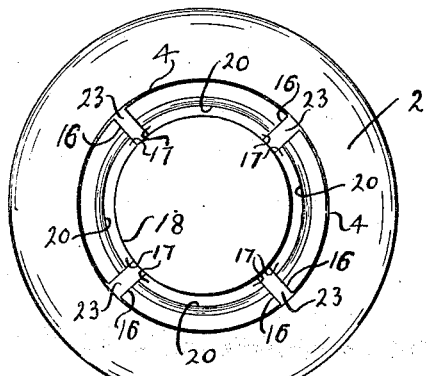
Fig. 5 is a bottom plan view looking into the mouth of the chuck in the direction of the arrow in Fig. 1.
Figure 2:
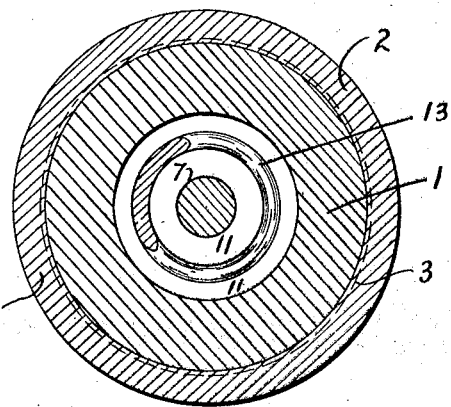
Fig. 2 is a transverse section on the line 2—2 of Fig. 1.

In the form of my invention illustrated 1 is a head or crown portion and 2 is a skirt portion having threaded engagement upon the crown 1 at 3. This skirt portion 2 constitutes what may be termed a clutch ring.

The outer end of the skirt portion 2 is provided with an outwardly convergent concentric conical orifice 4.

The portions 1 and 2 together constitute a casing having a cylindrical interior 5 and the orifice 4 constitutes an outwardly convergent concentric conical mouth at one end of the casing.

The crown 1 is provided with an axial orifice 6 through which a stem 7 projects into the interior 5 of the casing.

The inner end of this stem carries an enlarged head 8, in the form of a disk, and upon the outer end of the stem is secured a cap 9 by means of a pin 10.

The inner end of the crown 1 is provided with a concentric recess 11 the purpose of which will presently appear.

Slidably mounted upon the stem 7 is a bearing washer 12 and also mounted upon the stem is a compression coil spring 13 one end of which engages the inner end face 14 of the recess 11 and the other end engages against the bearing washer 12.

Mounted within the casing are four co-operating segmental collet sections 15.

Each of these collet sections comprises a longitudinally disposed jaw portion 16 and a flange 17 extending radially inward from the inner end of this jaw portion.

The flanges 17 are disposed at right angles to the jaw portions 16 and the outer faces 18 thereof are inclined.

Figure 1:
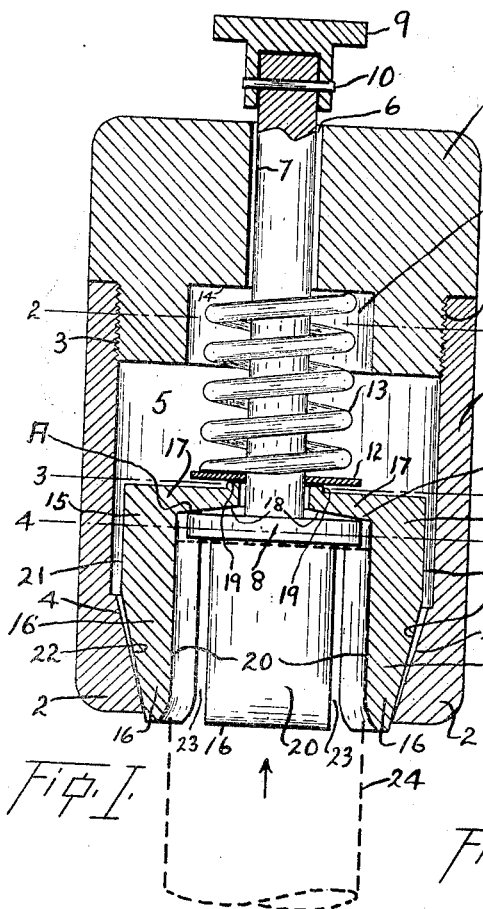
Fig. 1 is a central longitudinal section through a chuck constructed in accordance with my invention.
Figure 3:
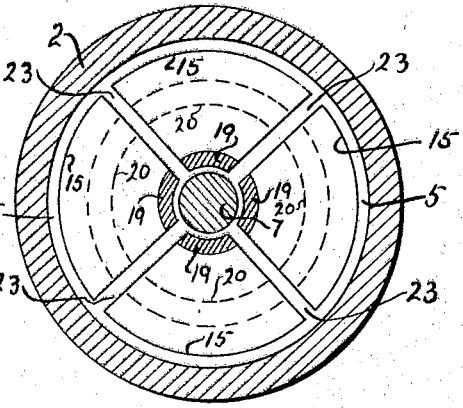
Fig. 3 is a transverse section on the line 3—3 of Fig. 1.
Figure 4:
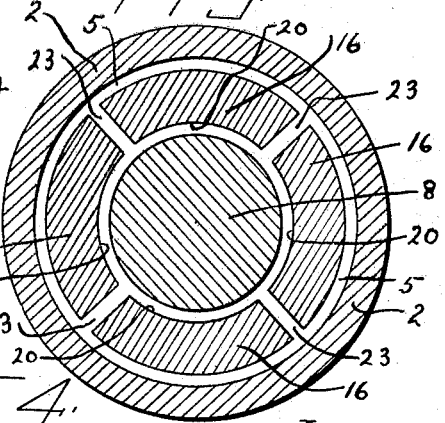
Fig. 4 is a transverse section on the line 4—4 of Fig. 1.

At the inner end of each flange 17 is formed an axially disposed protuberance 19 (see Figs. 1 and 3).

The periphery of the enlarged head 8 of the stem 7 engages the inclined faces 18 of the flanges 17 intermediately of the length of said flanges at "A" (see Fig. 1).

The inner faces 20 of the jaws 16 are of cylindrical curvature.

The outer peripheral faces of the collet sections 15 towards the inner ends 21 thereof are of cylindrical curvature and towards the outer ends are of conical curvature at 22, the inclination of the conical portions 22 being less than that of the conical mouth 4 formed in the casing.

The spaces separating the collet sections 15 are indicated at 23.

The collet sections 15 co-operate with each other and constitute a split or divided collet adapted to grip work inserted therein as will presently appear.

A piece of cylindrical stock or work gripped within my chuck is shown in broken lines at 24 in Fig. 1.

The construction and operation of my invention is as follows:—

From an examination of Fig. 1 it will be noted that the spring 13 normally forces the collet axially outward within the mouth 4 so that the conical portions 22 engage the mouth at the extreme outer end thereof.

When it is desired to grip a piece of stock the chuck is simply pushed onto the stock so that the stock passes inwardly between the jaws 16.

When the work has been pushed fully home it will be gripped between the cylindrical inner faces 20 of the jaws due to the action of the spring 13 which provides this initial grip.

As axial pull is applied to this stock 24 in the chuck, the collet sections 15 will be pulled outwardly and due to the engagement between the conical faces 22 of the collet sections and the converging conical mouth 4 of the casing, the collet sections will be restricted radially inward to more tightly grip the stock.

In this way, as the axial pull is increased, the grip upon the work will be tightened.

When it is desired to release the work it is simply necessary to pull the stem 7 outwardly by means of the cap 9. This retracts the collet 15 axially inward through the mouth 4 and releases the grip upon the stock.

In this operation of retracting the collet, the outer ends of the jaws 16 are expanded radially outward so as to be held at all times against the periphery of the mouth 4.

This is an important feature and is accomplished as follows:—

The outer face of the bearing washer 12 engages the protuberances 19, which are located at the extreme inner ends of the flanges 17 of the collet sections. The periphery of the disk 8 engages the inclined faces 18 of the flanges 17 at points "A" located intermediately of the length of the flanges and at a greater radius than the protuberances 19.

It will thus be seen that, as the stem 7 is withdrawn and with it the head 8, the point of engagement "A" of the head with the flange 17 of each collet section constitutes a fulcrum so that the jaws 16 are expanded radially outward as the collet is retracted.

In this way the withdrawal of the stem expands the mouth of the collet uniformly and causes the jaws to hug the mouth of the casing as the collet is retracted.

My chuck will prove of great value in connection with such machines as cotton ring spinning frames in which a large number of bobbins must be removed quickly.

From the foregoing it will be apparent that I have devised an improved chuck for use as a pulling or lifting chuck or in cases where an axial pull load is to be carried, which is of extremely simple and inexpensive construction, which may be very conveniently and readily secured to and disengaged from work to be gripped and whereby the objects of my invention have been attained.

Various modifications may be made in my invention without departing from the spirit thereof or the scope of the claim and therefore the exact forms shown are to be taken as illustrative only and not in a limiting sense and I desire, that only such limitations shall be placed thereon as are imposed by the prior art or are specifically set forth in the appended claim.

What I claim as my invention is:

A chuck of the class described comprising, a casing having a convergent mouth at one end thereof, a split collet co-axially mounted within said casing consisting of a plurality of co-operating segmental collet sections, each collet section formed with a tapered surface operatively engaging within the mouth of the casing, spring means within the casing for forcing the collet sections axially outward, a stem projecting axially from the end of the casing remote from the mouth, said stem operatively co-acting with the collet sections whereby drawing of the stem outwardly will operate to withdraw the collet section axially inward into the casing and simultaneously force the outer ends of the jaws radially outward against the mouth of the casing.

ROBERT BURNETT BUCHANAN.